United States Patent
Yamada et al.

(10) Patent No.: US 10,526,482 B2
(45) Date of Patent: Jan. 7, 2020

(54) POLYBUTYLENE TEREPHTHALATE RESIN COMPOSITION

(71) Applicant: WinTech Polymer Ltd., Tokyo (JP)

(72) Inventors: Shinya Yamada, Fuji (JP); Kouichi Sakata, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 65 days.

(21) Appl. No.: 15/770,026

(22) PCT Filed: Oct. 26, 2016

(86) PCT No.: PCT/JP2016/081763
§ 371 (c)(1),
(2) Date: Apr. 20, 2018

(87) PCT Pub. No.: WO2017/073629
PCT Pub. Date: May 4, 2017

(65) Prior Publication Data
US 2018/0319976 A1   Nov. 8, 2018

(30) Foreign Application Priority Data
Oct. 30, 2015 (JP) ................. 2015-214131

(51) Int. Cl.
*C08K 5/29* (2006.01)
*C08L 67/02* (2006.01)
*C08K 5/524* (2006.01)

(52) U.S. Cl.
CPC ............... *C08L 67/02* (2013.01); *C08K 5/29* (2013.01); *C08K 5/524* (2013.01); *C08L 2203/30* (2013.01)

(58) Field of Classification Search
USPC ........................................................ 528/308
See application file for complete search history.

(56) References Cited

U.S. PATENT DOCUMENTS

| | | | |
|---|---|---|---|
| 5,248,713 A | 9/1993 | Lunk et al. | |
| 8,404,763 B2 | 3/2013 | Sakata et al. | |
| 2011/0092616 A1 | 4/2011 | Sakata et al. | |
| 2014/0058015 A1 | 2/2014 | Yamada et al. | |

FOREIGN PATENT DOCUMENTS

| | | |
|---|---|---|
| CN | 101463183 A | 6/2009 |
| JP | H05-508179 A | 11/1993 |
| JP | H09-124908 A | 5/1997 |
| JP | 2005-082642 A | 3/2005 |
| JP | 2007-119645 | 5/2007 |
| JP | 2008-024802 A | 2/2008 |
| JP | 2011-222451 A | 11/2011 |
| JP | 2015-159693 A | 9/2015 |
| WO | WO 2009/150833 A1 | 12/2009 |
| WO | WO 2017/072642 A1 | 5/2017 |
| WO | WO 2017/026476 A1 | 5/2018 |

OTHER PUBLICATIONS

Office Action issued to CN Patent Application No. 201680061058.4, dated Sep. 14, 2018.
Extended European search report issued in European Patent Application No. 16859858.9, dated Oct. 26, 2018.
Notification of Reasons for Refusal in Japanese Patent Application No. 2017-533647, dated Jul. 25, 2017.
Notification of Reasons for Refusal in Japanese Patent Application No. 2017-533647, dated Oct. 10, 2017.

*Primary Examiner* — Terressa Boykin
(74) *Attorney, Agent, or Firm* — Knobbe, Martens, Olson & Bear LLP

(57) ABSTRACT

A polybutylene terephthalate resin composition in which it is possible to effectively suppress discoloration without lowering the heat shock resistance. The polybutylene terephthalate resin composition is part of a molded article having a lightness L* value of 80 or higher as measured using a color difference meter, and includes a polybutylene terephthalate resin having a terminal carboxyl group content of 30 meq/kg or less, a carbodiimide compound, and a phosphite compound; and the phosphite compound content is 0.05-0.15 parts by mass per 100 parts by mass of polybutylene terephthalate resin.

4 Claims, 1 Drawing Sheet

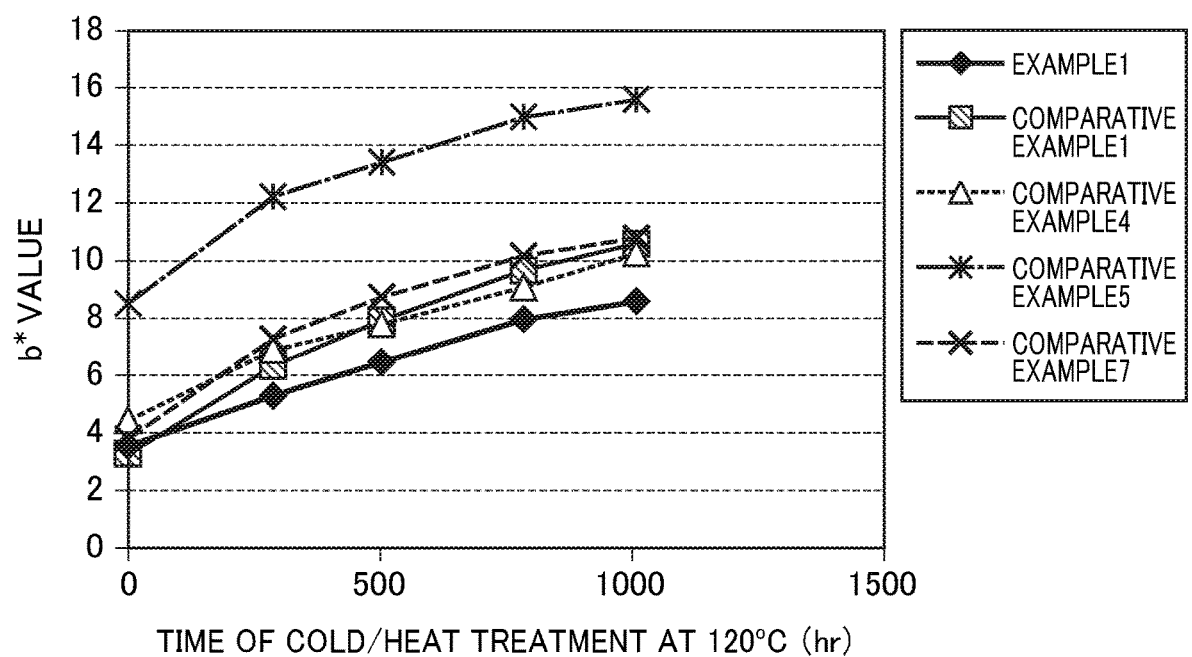

POLYBUTYLENE TEREPHTHALATE RESIN COMPOSITION

This application is the U.S. National Phase under 35 U.S.C. § 371 of International Application PCT/JP2016/081763, filed Oct. 26, 2016, designating the U.S., and published in Japanese as WO 2017/073629 on May 4, 2017 which claims priority to Japanese Patent Application No. 2015-214131, filed Oct. 30, 2015, the entire content of which is incorporated herein by reference.

TECHNICAL FIELD

The present invention relates to a polybutylene terephthalate resin composition, and more specifically relates to a polybutylene terephthalate resin composition for forming a molded article having a lightness L* value of 80 or more as measured with a color difference meter.

BACKGROUND ART

Polybutylene terephthalate resins, which have excellent mechanical, electrical, and other physical and chemical properties as well as good processability, are used as engineering plastics for a wide range of uses such as electrical/electronic components. Further, polybutylene terephthalate resins may be blended with fibrous bulking agents such as glass fiber to produce resin compositions for forming reinforced molded articles having improved thermal resistance and strength.

Such polybutylene terephthalate resins often find their uses, for example, as housing materials for sensors and/or ECUs used for electric control in the automotive field. In order to meet a requirement of low warpage, these articles are often alloyed with an amorphous resin such as polycarbonate, or mixed with an inorganic bulking agent in a form of a high-aspect ratio flake or power.

Meanwhile, for a component (an insert molded article) to be placed in an environment experiencing intensive temperature rises and falls such as in an automobile engine room, toughness may often be improved by blending an elastomer or the like in order to prevent the occurrence of a crack due to strain arising from difference in linear expansion between metal and resin. However, a large amount of an elastomer required to be blended for obtaining sufficient heat shock resistance may cause a problem of a decrease in strength. For example, a system alloyed with an amorphous resin such as polycarbonate or mixed with an inorganic bulking agent in a form of a high-aspect ratio flake or power in order to achieve low warpage as described above tends to show decreased heat shock resistance.

In view of solving this problem, Patent Document 1, for example, proposes a polybutylene terephthalate resin composition in which a specific amount of a carbodiimide compound is blended in a polybutylene terephthalate resin. The above resin composition can confer excellent heat shock resistance on a molded article.

Further, a carbodiimide compound blended in a polybutylene terephthalate resin as described above is widely known to be able to improve hydrolysis resistance.

However, when a molded article formed from a polybutylene terephthalate resin composition in which a carbodiimide compound is blended in a polybutylene terephthalate resin is used under a high-temperature environment, carbodiimide may undergo heat-induced yellow discoloration. As a result, the molded article may suffer from discoloration. For example, the color of an automotive component for which heat shock resistance is required is usually black. However, the product value of a pale-colored molded article would be significantly reduced due to discoloration.

For example, a phosphorus-based stabilizer and the like may be added to prevent heat-induced discoloration, but will interfere with an improving effect on heat shock resistance.
Patent Document 1: PCT International Publication No. WO2009/150833

DISCLOSURE OF THE INVENTION

Problems to be Solved by the Invention

The present invention is made in view of the above actual circumstances. An object of the present invention is to provide a polybutylene terephthalate resin composition capable of preventing discoloration effectively without reducing heat shock resistance.

Means for Solving the Problems

After conducting extensive studies to achieve the above objective, the present investors found that heat-induced discoloration can be prevented while maintaining excellent heat shock resistance by blending a carbodiimide compound and a specific amount of a phosphite-based compound with a polybutylene terephthalate resin having a terminal-carboxyl group content of 30 meq/kg or less. The present invention was then completed. That is, the present invention can provide the following.

(1) A first embodiment of the present invention is a polybutylene terephthalate resin composition for forming a molded article having a lightness L* value of 80 or more as measured with a color difference meter, the polybutylene terephthalate resin composition including: a polybutylene terephthalate resin having a terminal-carboxyl group content of 30 meq/kg or less; a carbodiimide compound; and a phosphite-based compound, the content of the phosphite-based compound being 0.05 parts by mass or more to 0.15 parts by mass or less per 100 parts by mass of the polybutylene terephthalate resin.

(2) A second embodiment of the present invention is the polybutylene terephthalate resin composition according to the first embodiment, wherein the content of the carbodiimide compound is 0.01 parts by mass or more to 5.0 parts by mass or less per 100 parts by mass of the polybutylene terephthalate resin.

(3) A third embodiment of the present invention is the polybutylene terephthalate resin composition according to the first or second embodiment, wherein the molded article has heat shock resistance of 300 cycles or more as measured according to a heat shock resistance test, and has an increase in a hue b* value by 5 or less before and after treatment as measured with a color difference meter before and after cold and heat treatment of 120° C.×1000 hours, the heat shock resistance test being defined as follows: a cycle where the molded article is heated at 140° C. for 1 hour and 30 minutes in a cold and heat shock testing machine, and then cooled to −40° C. and maintained for 1 hour and 30 minutes, and then heated to 140° C. again is repeated to determine the number of cycles until a crack occurs in the molded article, thereby evaluating heat shock resistance.

(4) A fourth embodiment of the present invention is the polybutylene terephthalate resin composition according to the third embodiment, wherein the molded article has a hue b* value of 10 or less as measured with a color difference meter before and after cold and heat treatment of 120° C.×1000 hours.

Effects of the Invention

The present invention can provide a polybutylene terephthalate resin composition capable of preventing discoloration effectively without reducing heat shock resistance.

BRIEF DESCRIPTION OF THE DRAWINGS

FIG. 1 is a graph showing the measurement results of hue b* values versus the time of cold and heat treatment at 120° C. from Example and Comparative Examples.

PREFERRED MODE FOR CARRYING OUT THE INVENTION

Below, the specific embodiments of the present invention will be described in detail. It is noted that the present invention shall not be limited to the following embodiments. Modifications may be made without departing from the scope and spirit of the present invention.

<<1. Polybutylene Terephthalate Resin Composition>>

The polybutylene terephthalate resin composition (hereinafter may also be simply referred to the "resin composition") according to an embodiment of the present invention may be used to form a molded article having a lightness L* value of 80 or more as measured with a color difference meter, and in particular may be used to form a molded article for which heat shock resistance is required, such as an automotive component and/or an electric/electronic component.

Specifically, the above polybutylene terephthalate resin composition includes a polybutylene terephthalate resin (A) and a carbodiimide compound (B). Further, the polybutylene terephthalate resin composition according to an embodiment of the present invention is characterized in that a specific amount of a phosphite-based compound is contained in a resin composition including the polybutylene terephthalate resin and the carbodiimide compound.

A molded article formed from a polybutylene terephthalate resin composition having excellent mechanical, electrical, or other physical and chemical properties is often used as a molded article of an automobile component and the like, and is further used under an environment experiencing intense temperature rises and falls. Therefore, a carbodiimide compound is contained to improve heat shock resistance. However, a molded article obtained from a polybutylene terephthalate resin composition including a carbodiimide compound as described above may disadvantageously undergo heat-induced discoloration to yellow or other colors. Further, the discoloration problem becomes more significant as the lightness of the molded article increases, for example, as the lightness L* value of the molded article increases to 80 or more as measured with a color difference meter. This is a factor that reduces the product value of the molded article.

The present investors found that when a specific amount of a phosphite-based compound is contained in a resin composition in which a carbodiimide compound is added to a polybutylene terephthalate resin, heat-induced discoloration can be prevented effectively while maintaining the heat shock resistance of a molded article. Below, each of the components will be described in detail.

Polybutylene Terephthalate Resin (A)

A polybutylene terephthalate resin as a basis resin of the resin composition according to an embodiment of the present invention is a polybutylene terephthalate-based polymer which may be obtained by performing polycondensation of a dicarboxylic-acid component including at least terephthalic acid or an esterified derivative thereof (a lower alcohol ester and the like) and a glycol component including at least alkylene glycol having 4 carbon atoms (1,4-butanediol) or an esterified derivative thereof.

The polybutylene terephthalate resin is not limited to a homo-polybutylene terephthalate resin, but may be, for example, a copolymer including butylene terephthalate units in a percentage of 60 mol % or more (in particular, about 75 to 95 mol %).

There is no particular limitation on the polybutylene terephthalate resin, but it may have a terminal-carboxyl group content of 30 meq/kg or less, preferably 25 meq/kg or less. Here, the terminal-carboxyl group content may be, for example, measured as follows. That is, a sample of grounded polybutylene terephthalate may be dissolved in benzyl alcohol under a temperature condition of 215° C. for 10 minutes, and then titrated with 0.01 N of aqueous sodium hydroxide to determine the content.

A polybutylene terephthalate resin having a terminal-carboxyl group content of more than 30 meq/kg will reduce the improving effect on heat shock resistance regardless of the addition amount of a carbodiimide compound described below. Further, the strength may be significantly decreased due to hydrolysis under a high-temperature and moist environment.

Moreover, there is no particular limitation on the lower limit of the terminal-carboxyl group content, but those having less than 5 meq/kg are generally difficult to manufacture. Furthermore, those having less than 5 meq/kg may not be able to sufficiently promote a reaction with a carbodiimide compound, resulting in an insufficient improving effect on heat shock resistance. In view of the above, the terminal-carboxyl group content of the polybutylene terephthalate resin is preferably 5 meq/kg or more, more preferably 10 meq/kg or more.

There is no particular limitation on the intrinsic viscosity (IV) of the polybutylene terephthalate resin, but it is preferably 0.65 dL/g or more to 1.20 dL/g or less, more preferably 0.75 dL/g or more to 1.0 dL/g or less. An intrinsic viscosity in the range of 0.65 dL/g or more to 1.20 dL/g or less tends to provide a fluidity required for molding, for example, an insert molded article. It is noted that polybutylene terephthalate resins having different intrinsic viscosities may be blended to obtain a polybutylene terephthalate resin having a desired intrinsic viscosity. For example, a polybutylene terephthalate resin having an intrinsic viscosity of 1.00 dL/g may be blended with a polybutylene terephthalate resin having an intrinsic viscosity of 0.70 dL/g to obtain a polybutylene terephthalate resin having an intrinsic viscosity of 0.90 or less. It is noted that the intrinsic viscosity can be measured, for example, in o-chlorophenol under a temperature condition of 35° C.

Dicarboxylic acid components (comonomer components) other than terephthalic acid and an esterified derivative thereof in the polybutylene terephthalate resin include, for example, aromatic dicarboxylic acid components (C6-C12 aryl dicarboxylic acid and the like such as isophthalic acid, phthalic acid, naphthalenedicarboxylic acid, and diphenyl ether dicarboxylic acid), aliphatic dicarboxylic acid components (C4-C16 alkyl dicarboxylic acid such as succinic acid, adipic acid, azelaic acid, and sebacic acid, and C5-C10 cycloalkyl dicarboxylic acid such as cyclohexanedicarboxylic acid), esterified derivatives thereof, or the like. These dicarboxylic acid components may be used alone or in a combination of two or more.

Among these, preferred dicarboxylic acid components (comonomer components) include aromatic dicarboxylic acid components (in particular, C6-C10 aryl dicarboxylic acid such as isophthalic acid) and aliphatic dicarboxylic acid components (in particular, C6-C12 alkyl dicarboxylic acid such as adipic acid, azelaic acid, and sebacic acid).

Glycol components (comonomer components) other than 1,4-butanediol include, for example, aliphatic diol components [for example, alkylene glycol (C2-C10 alkylene glycol such as ethylene glycol, propylene glycol, trimethylene glycol, 1,3-butylene glycol, hexamethylene glycol, neopentyl glycol, 1,3-octanediol; polyoxy C2-C4 alkylene glycol such as diethylene glycol, triethylene glycol, and dipropylene glycol; and the like), alicyclic diol such as cyclohexane dimethanol and hydrogenated bisphenol A, and the like]; aromatic diol components [aromatic alcohol such as bisphenol A and 4,4-dihydroxybiphenyl; C2-C4 alkylene oxide adduct of bisphenol A and the like (for example, 2-mol ethylene oxide adduct of bisphenol A, 3-mol propylene oxide adduct of bisphenol A, and the like]; esterified derivatives thereof; or the like. These glycol components may also be used alone or in a combination of two or more.

Among these, particularly preferred glycol components (comonomer components) include aliphatic diol components (in particular, C2-C6 alkylene glycol, polyoxy C2-C3 alkylene glycol such as diethylene glycol, and alicyclic diol such as cyclohexanedimethanol).

Any of polybutylene terephthalate-based polymers obtainable by polycondensation of the aforementioned compounds as monomer components may be suitably used as a polybutylene terephthalate resin component of the polybutylene terephthalate resin composition. Further, a combination of a homo-polybutylene terephthalate polymer and a polybutylene terephthalate copolymer is also useful.

Carbodiimide Compound (B)

The resin composition according to an embodiment of the present invention includes a carbodiimide compound blended with the aforementioned polybutylene terephthalate resin. The inclusion of a carbodiimide compound as described above can improve heat shock resistance, enabling, for example, the occurrence of a crack and the like due to strain arising from a difference in linear expansion to be effectively prevented even in an environment experiencing intense temperature rises and falls. Further, hydrolysis resistance can also be improved to reduce decomposition of a resin component and the like, preventing a decrease in strength.

A carbodiimide compound has a carbodiimide group (—N=C=N—) in the molecule. Carbodiimide compounds include an aliphatic carbodiimide compound in which the main chain is aliphatic, an alicyclic carbodiimide compound in which the main chain is alicyclic, an aromatic carbodiimide compound in which the main chain is aromatic, and the like. Any of these may be used. Among these, the aromatic carbodiimide compound is preferred considering that the improving effects on heat shock resistance and hydrolysis resistance are superior.

Specifically, aliphatic carbodiimide compounds include diisopropylcarbodiimide, dioctyldecylcarbodiimide, and the like. Further, alicyclic carbodiimide compounds include dicyclohexylcarbodiimide and the like. Beside these monofunctional aliphatic carbodiimide compounds and alicyclic carbodiimides, polyfunctional carbodiimide may be used which can be synthesized by a decarboxylation-condensation reaction of one or more selected from hexamethylene diisocyanate, cyclohexane-1,4-diisocyanate, isophorone diisocyanate, 4,4'-dicyclohexylmethane diisocyanate, methylcyclohexane diisocyanate, 1,3-bis(isocyanatomethyl)cyclohexane, xylylene diisocyanate, and tetramethylxylylene diisocyanate.

Further, aromatic carbodiimide compounds include mono- or di-carbodiimide compounds such as diphenylcarbodiimide, di-2,6-dimethylphenyl carbodiimide, N-triyl-N'-phenylcarbodiimide, di-p-nitrophenylcarbodiimide, dipaminophenylcarbodiimide, di-p-hydroxyphenylcarbodiimide, di-p-chlorphenylcarbodiimide, di-p-methoxyphenycarbodiimide, di-3,4-dichlorphenylcarbodiimide, di-2,5-dichlorphenylcarbodiimide, di-o-chlorphenylcarbodiimide, p-phenylene-bis-di-o-triylcarbodiimide, p-phenylene-bis-dicyclohexylcarbodiimide, p-phenylene-bis-di-p-chlorphenylcarbodiimide, and ethylene-bis-diphenylcarbodiimide; polycarbodiimide compounds such as poly(4,4'-diphenylmethanecarbodiimide), poly(3,5'-dimethyl-4,4'-biphenylmethanecarbodiimide), poly(p-phenylenecarbodiimide), poly(m-phenylenecarbodiimide), poly(3,5'-dimethyl-4,4'-diphenylmethanecarbodiimide), poly(naphthylenecarbodiimide), poly(1,3-diisopropylphenylenecarbodiimide), poly(1-methyl-3,5-diisopropylphenylenecarbodiimide), poly(1,3,5-triethylphenylenecarbodiimide), and poly(triisopropylphenylenecarbodiimide). Among these, di-2,6-dimethylphenylcarbodiimide, poly(4,4'-diphenylmethanecarbodiimide), poly(phenylenecarbodiimide), and poly(triisopropylphenylenecarbodiimide) are in particular suitably used. It is noted that these may be used alone or in a combination of two or more.

Further, there is no particular limitation on the carbodiimide compound, but those having a molecular weight of 2000 or more are preferably used. Those having a molecular weight of less than 2000 may generate a gas or an odor, for example, when residence time is long in melt kneading and molding.

The blending amount of a carbodiimide compound in the polybutylene terephthalate resin composition is preferably 0.01 parts by mass or more to 5.0 parts by mass or less per 100 parts by mass of the polybutylene terephthalate resin (A), more preferably 0.1 parts by mass or more to 3.0 parts by mass or less, and even more preferably 0.3 parts by mass or more to 2.5 parts by mass or less.

When the blending amount of a carbodiimide compound is less than 0.01 parts by mass, the improving effect on heat shock resistance may not sufficiently be obtained. Further, the effect of hydrolysis resistance may not be sufficiently obtained, either. On the other hand, a blending amount of more than 5.0 parts by mass may tend to decrease fluidity and/or generate a gel component and/or carbide upon a compounding and/or molding process, resulting in decreased machinery properties such as tensile strength and bending strength. Further, the yield of isocyanate gas originating from a carbodiimide compound may be increased, resulting in a poor work environment.

Phosphite-Based Compound (C)

The polybutylene terephthalate resin composition according to an embodiment of the present invention includes a phosphite-based compound so that the content thereof is 0.05 parts by mass or more to 0.15 parts by mass or less per 100 parts by mass of a polybutylene terephthalate resin.

The polybutylene terephthalate resin composition according to an embodiment of the present invention includes a specific amount of a phosphite-based compound as described above. This can effectively prevent heat-induced discoloration of a molded article without impairing the improving effect on heat shock resistance by virtue of the inclusion of a carbodiimide compound.

Specifically, phosphite-based compounds include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenylbisphenol A pentaerythritol diphosphite, bis(nonylphenyl)pentaerythritol diphosphite, dicyclohexylpentaerythritol diphosphite, and the like.

As described above, the content of a phosphite-based compound is 0.05 parts by mass or more to 0.15 parts by mass or less per 100 parts by mass of a polybutylene terephthalate resin. Alternatively, it is 0.08 parts by mass or more to 0.12 parts by mass or less per 100 parts by mass of a polybutylene terephthalate resin. A content of less than 0.05 parts by mass would not be able to sufficiently prevent heat-induced discoloration. On the other hand, a content of more than 0.15 parts by mass may reduce the heat shock resistance and hydrolysis resistance of a molded article.

Here, conventionally, a polybutylene terephthalate resin composition is alloyed by including a polyester resin other than a polybutylene terephthalate resin, such as a polycarbonate resin and/or a polyethylene terephthalate resin, in a polybutylene terephthalate resin as the main component for the purpose of preventing warpage deformation and the like. Then, a phosphorus compound is commonly added to such a polybutylene terephthalate resin composition alloyed with a polyester resin to allow the phosphorus compound to act as a transesterification inhibitor, thereby inhibiting a transesterification reaction between a polybutylene terephthalate resin and the alloy resin. However, as understood from literatures such as Patent Document 1 (WO2009/150833) and Japanese Unexamined Patent Application Publication No. 2006-111693, alloying a polybutylene terephthalate resin with a polycarbonate resin and/or a polyethylene terephthalate resin may result in decreased heat shock resistance and/or decreased hydrolysis resistance. Therefore, the polybutylene terephthalate resin composition according to an embodiment of the present invention preferably includes neither a polycarbonate resin, a polyethylene terephthalate resin, nor the like, i.e., is preferably not alloyed. Therefore, the phosphite-based compound (C) differs from a phosphorus compound as a transesterification inhibitor to be added for inhibiting transesterification.

Bulking Agent (D)

The polybutylene terephthalate resin composition according to an embodiment of the present invention may include a bulking agent as an additive. The inclusion of a bulking agent in a resin composition can enhance mechanical strength and/or stiffness.

Bulking agents include fibrous bulking agents or non-fibrous bulking agents in platelike, powderlike, spherical, or other forms.

Fibrous bulking agents include glass fiber, carbon fiber, potassium-titanate fiber, silica-alumina fiber, zirconia fiber, metal fiber, organic fiber, and the like. Among these, glass fiber is preferably used.

Specifically, any known types of glass fiber may be preferably used. There is no particular limitation on the diameter and cross-sectional shape of glass fiber, and any of cylinder-like, cocoon-like, and ellipse-like cross-sections may be used. There is also no particular limitation on the length and method of cutting glass for manufacturing chopped strands, rovings, and the like. Further, there is also no particular limitation on the type of glass, but the E glass and/or an anticorrosion glass containing elemental zirconium in the composition are suitably used in view of quality.

Moreover, a fibrous bulking agent which is surface-treated with an organic treatment agent such as an aminosilane compound and an epoxy compound may suitably be used in order to improve interface properties between the fibrous bulking agent and a resin. There is no particular limitation on the aminosilane compound and the epoxy compound which may be used for the aforementioned fibrous bulking agent, and any known agent may be used.

Non-fibrous bulking agents include talc, mica, glass flakes, glass beads, calcium carbonate, and the like. Among these, talc and mica are preferred.

The blending amount of a bulking agent in the resin composition is preferably 0 part by mass or more to 100 parts by mass or less per 100 parts by mass of the polybutylene terephthalate resin (A), more preferably 10 parts by mass or more to 50 parts by mass or less per 100 parts by mass of the polybutylene terephthalate resin (A). A blending amount falling within the above range can improve mechanical properties without impairing moldability.

Others (E)

In addition to the aforementioned additives, the polybutylene terephthalate resin composition according to an embodiment of the present invention may include a known substance which is generally added to a thermoplastic resin, a thermosetting resin, and the like in order to further confer a desired property depending on the purpose. For example, the following may be blended in a range where the effects of the present invention are not impaired: a stabilizer such as an antioxidant, a heat-resistant stabilizer, and an ultraviolet absorber; an antistatic agent; a coloring agent such as a dye and a pigment; a plasticizing agent; a flow improver; a crystallization accelerator; a crystal nucleating agent; a hydrolysis resistance improver such as an epoxy compound; a lubricating agent; a release agent; and the like.

<<2. Method of Preparing Polybutylene Terephthalate Resin Composition>>

The polybutylene terephthalate resin composition according to an embodiment of the present invention can be easily prepared using a common facility and method as in a method of preparing a conventional resin composition.

Specifically, for example, each of the components of the resin composition may be mixed, and kneaded with a single or twin screw extruder or a melt kneader of a different type to prepare moldable pellets. Multiple extruders or melt kneaders of different types may be used. All of the components may be simultaneously fed through a hopper, or some of the components may be fed through a side feeding inlet.

When kneading with an extruder to obtain pellets, the temperature of an extruder cylinder is adjusted so that the resin temperature inside the extruder is preferably 240° C. to 300° C., more preferably 250° C. to 270° C. When the resin temperature is lower than 240° C., heat shock resistance and/or hydrolysis resistance may not sufficiently be obtained due to an insufficient reaction between a polybutylene terephthalate resin and a carbodiimide compound. On the other hand, when the resin temperature is higher than 300° C., the resin may tend to be more susceptible to decomposition.

Further, the carbodiimide compound (B) of the resin composition may be, for example, blended as a masterbatch having a matrix of a resin. A masterbatch prepared with a polybutylene terephthalate resin is suitably used, but those masterbatches prepared with other resins may also be used. Specifically, for example, when a masterbatch prepared with a polybutylene terephthalate resin is used, the blending amounts of the resin and a carbodiimide compound may be adjusted so as to fall within the predetermined ranges. Further, the masterbatch may be pre-introduced upon melt kneading to obtain uniformly mixed pellets.

<<3. Properties of Polybutylene Terephthalate Resin Composition>>

The polybutylene terephthalate resin composition according to an embodiment of the present invention can confer excellent heat shock resistance and/or hydrolysis resistance on a molded article obtained by molding the resin composition. That is, the occurrence of a crack and the like due to strain arising from a difference in linear expansion can be effectively prevented even under an environment experiencing intense temperature rises and falls, and decomposition of resin components and the like can also be inhibited to prevent a decrease in strength and the like.

Further, the polybutylene terephthalate resin composition according to an embodiment of the present invention can effectively prevent heat-induced discoloration to yellow or other colors while maintaining heat shock resistance as described above.

More specifically, a molded article obtained by molding this polybutylene terephthalate resin composition has heat shock resistance of 300 cycles or more as determined according to the heat shock test, and further has an increase in a hue b* value by 5 or less before and after treatment as measured with a color difference meter before and after cold and heat treatment of 120° C.×1000 hours. Further, the hue b* value after the cold and heat treatment of 120° C.×1000 hours is 10 or less. The polybutylene terephthalate resin composition according to an embodiment of the present invention may be used to obtain a molded article having a lightness L* value of 80 or more as measured with a color difference meter as described above. A molded article having such a relatively high lightness may show significant heat-induced discoloration to yellow or other colors. In particular, when an increase in a hue b* value after the cold and heat treatment is 5 or more as compared with the initial hue b* value, discoloration is significant enough to be visually recognized. However, according to the polybutylene terephthalate resin composition according to the present invention, heat-induced discoloration to yellow or other colors of the resulting molded article can be effectively prevented.

It is noted that heat shock resistance can be evaluated according to the following heat shock resistance test. That is, a molded article such as an insert molded article formed from the resin composition is heated at 140° C. for 1 hour and 30 minutes in a cold and heat shock testing machine, and then cooled to −40° C. and maintained for 1 hour and 30 minutes, and then heated to 140° C. again. This is considered as one cycle. Then, the number of cycles until a crack occurs in the molded article is determined. That number of cycles can be used to evaluate heat shock resistance.

As described above, the polybutylene terephthalate resin composition according to an embodiment of the present invention is particularly useful for forming a molded article, such as automotive components and the like, for use under an environment experiencing intense temperature rises and falls. It also can effectively prevent discoloration such as yellow discoloration while maintaining heat shock resistance, preventing a reduction of the product value of the molded article.

EXAMPLES

Below, the present invention will be described in more detail with reference to Examples, but the present invention shall not be limited to these Examples in any sense.

Example 1 and Comparative Examples 1 to 7

[Production of Resin Composition]

Components shown in Table 1 below were weighed out and dry mixed, and then melt kneaded with a 30-mm φ twin screw extruder (TEX-30, Japan Steel Works, LTD.) to produce pellets (cylinder temperature: 260° C., discharge amount: 15 kg/h, screw speed: 150 rpm).

Here, the following were used as components of a resin composition.

Polybutylene Terephthalate (PBT) Resin (A)
    (A-1) from WinTech Polymer Ltd. having an intrinsic viscosity of 0.83 and a terminal-carboxyl group content of 14 meq/kg.

Carbodiimide Compound (B)
    Aromatic carbodiimide compound (B-1); Rhein Chemie Japan, Ltd., STABAXOL P400

Phosphite-Based Compound (C)
    Bis(2,6-di-t-butyl-4-methylphenyl)pentaerythritol diphosphite (C-1); ADEKA, Inc., ADK STAB PEP36

Other Phosphorus Compounds (C')
    Tetrakis(2,4-di-t-butylphenyl)4,4'-biphenylene phosphonite (C'-1); Clariant (Japan) K.K., Hostanox P-EPQ
    Calcium dihydrogen phosphate (C'-2); Taihei Chemical Industrial Co., Ltd., industrial grade monobasic calcium phosphate
    Sodium dihydrogen phosphate (C'-3); Yoneyama Chemical Industry Co., Ltd., monobasic sodium phosphate Fibrous bulking agent (D)
    Glass fiber (D-1); Nippon Electric Glass Co., Ltd., ECS03-T127

[Evaluation of Molded Article]

(Heat Shock Resistance)

The pellets produced were subject to insert injection molding in a mold for forming a test piece (a mold in which an iron core of 18 mm in length and 18 mm in width and 30 mm in height is to be inserted inside a rectangular column of 22 mm in length and 22 mm in width and 51 mm in height) at a resin temperature of 260° C., a mold temperature of 65° C., an injection time of 25 seconds, and a cooling time of 10 seconds so that the minimum thickness of a part of a resin portion was 1 mm, thereby manufacturing an insert molded article. The resulting insert molded article was subject to a heat shock resistance test with a cycle of heating at 140° C. for 1 hour and 30 minutes in a cold and heat shock testing machine, and then cooling to −40° C. and maintaining for 1 hour 30 minutes, and then heating to 140° C. again.

The above test determined the number of cycles until a crack occurred in the molded article, thereby the heat shock resistance was evaluated.

(Measurement of Lightness L* Value)

The insert molded article obtained as described above was measured for color with a spectroscopic color difference meter from Nippon Denshoku Industries Co., Ltd. (SE6000, Nippon Denshoku Industries Co., Ltd.) in accordance with the method of measuring reflection on an object using a spectrophotometer defined in JIS Z 8722:2009. Based on the results from the above, the lightness L* value was calculated according to the CIE 1976 L*a*b* color space defined in JIS Z 8730-4:2013.

(Measurement of Hue b* Value)

The insert molded article obtained as described above was heated at 120° C. in a cold and heat shock testing machine, and measured for a hue b* value with a spectroscopic color difference meter (SE6000, Nippon Denshoku Industries Co., Ltd.) both before the cold and heat treatment and after 1000 hours. Further, an increase in a b* value before and after the cold and heat treatment (a value obtained by subtracting the b* value before the treatment from the b* value after the treatment) was calculated. It is noted that the b* value is an index of the degree of yellowness in the CIE 1976 L*a*b* color space defined in JIS Z 8781-4:2013. A smaller value means a smaller degree of yellow discoloration of a molded article. Therefore, a smaller difference between the b* values before and after the treatment means a smaller degree of yellow discoloration, representing a preferred result.

It is noted that FIG. 1 is a graph showing the measurement results of hue b* values versus the time of cold and heat treatment at 120° C. from Example 1 and Comparative Examples 4, 5, and 7.

values after the cold and heat treatment while maintaining excellent heat shock resistance.

However, as seen in the results from Comparative Example 2, a polybutylene terephthalate resin composition in which a phosphite-based compound was added, but the content of the phosphite-based compound was 0.03 parts by mass per 100 parts by mass of a polybutylene terephthalate resin was not able to prevent discoloration due to the cold and heat treatment, and showed yellow discoloration. Further, as seen in the results from Comparative Example 3, a polybutylene terephthalate resin composition in which the content of a phosphite-based compound was 0.2 parts by mass per 100 parts by mass of a polybutylene terephthalate resin was found to show reduced heat shock resistance.

Moreover, as seen in the results from Comparative Examples 4 to 7, polybutylene terephthalate resin compositions in which phosphorus-based compounds other than a phosphite-based compound were added to resin compositions including a polybutylene terephthalate resin and a carbodiimide compound were not able to sufficiently prevent discoloration resulting from the cold and heat treatment, and showed yellow discoloration. It is noted that as understood from Comparative Example 6, the addition of a phosphorus-based compound in an amount required for preventing discoloration significantly reduces heat shock resistance. For this reason, when such a phosphorus compound is added, the addition amount of the phosphorus-based compound should be lowered within a range where heat shock resistance can be maintained. In that case, however, the phosphorus-based compound other than a phosphite-based compound may not be able to sufficiently prevent discoloration as seen in the results from Comparative Example 5.

TABLE 1

| Components of resin composition [Parts by mass] | | Example 1 | Comparative Example | | | | | | |
|---|---|---|---|---|---|---|---|---|---|
| | | | 1 | 2 | 3 | 4 | 5 | 6 | 7 |
| (A) PBT resin | A-1 | 100 | 100 | 100 | 100 | 100 | 100 | 100 | 100 |
| (B) Carbodiimide compound | B-1 | 0.8 | 0.8 | 0.8 | 0.8 | 0.8 | 0.8 | 0.8 | 0.8 |
| (C) Phosphite-based compound | C-1 | 0.1 | — | 0.03 | 0.2 | — | — | — | — |
| (C') Other phosphorus compounds | C'-1 | | | | | 0.1 | | | |
| | C'-2 | | | | | | 0.04 | 0.1 | |
| | C'-3 | | | | | | | | 0.1 |
| (D) Glass fiber | D-1 | 43 | 43 | 43 | 43 | 43 | 43 | 43 | 43 |
| Heat shock resistance (Cycles) | | 330 | 336 | 335 | 271 | 237 | 353 | 93 | 266 |
| Lightness L* value | | 92.58 | 92.52 | 92.54 | 92.60 | 92.03 | 90.07 | — | 91.42 |
| Hue b* value | 0 hr | 3.67 | 3.27 | 3.30 | 3.71 | 4.31 | 8.51 | — | 3.80 |
| | 1000 hr | 8.47 | 10.58 | 9.54 | 8.25 | 10.60 | 15.58 | — | 10.78 |
| | Increase from before to after treatment | 4.80 | 7.31 | 6.24 | 4.54 | 6.29 | 7.07 | — | 6.98 |

As understood from the results shown in Table 1, a polybutylene terephthalate resin composition including a polybutylene terephthalate resin and a carbodiimide compound (Comparative Example 1) was found to show discoloration after the cold and heat treatment.

In contrast, as shown in the results from Example 1, a molded article prepared from a polybutylene terephthalate resin composition in which a phosphite-based compound was added to a resin composition including a polybutylene terephthalate resin and a carbodiimide compound showed reduced discoloration with a small difference in hue b*

The invention claimed is:

1. A polybutylene terephthalate resin composition for forming a molded article for a housing of a sensor or ECU used for electric control in the automotive field, the molded article having a lightness L* value of 80 or more as measured with a color difference meter, the polybutylene terephthalate resin composition comprising:
   a polybutylene terephthalate resin having a terminal-carboxyl group content of 30 meq/kg or less; an aromatic carbodiimide compound; and a phosphite-based compound, the content of the phosphite-based compound being 0.05 parts by mass or more to 0.12 parts by mass or less per 100 parts by mass of the polybutylene terephthalate resin.

2. The polybutylene terephthalate resin composition according to claim 1, wherein the content of the aromatic carbodiimide compound is 0.01 parts by mass or more to 5.0 parts by mass or less per 100 parts by mass of the polybutylene terephthalate resin.

3. The polybutylene terephthalate resin composition according to claim 1 or 2, wherein the molded article has heat shock resistance of 300 cycles or more as measured according to a heat shock resistance test, and has an increase in a hue b* value by 5 or less before and after treatment as measured with a color difference meter before and after cold and heat treatment of 120° C.×1000 hours, the heat shock resistance test being defined as follows:

a cycle where the molded article is heated at 140° C. for 1 hour and 30 minutes in a cold and heat shock testing machine, and then cooled to −40° C. and maintained for 1 hour and 30 minutes, and then heated to 140° C. again is repeated to determine the number of cycles until a crack occurs in the molded article, thereby evaluating heat shock resistance.

4. The polybutylene terephthalate resin composition according to claim 3, wherein the molded article has a hue b* value of 10 or less as measured with a color difference meter before and after the cold and heat treatment of 120° C.×1000 hours.

* * * * *